(12) United States Patent
Alfred et al.

(10) Patent No.: US 7,570,445 B2
(45) Date of Patent: Aug. 4, 2009

(54) ADAPTIVELY ADJUSTING SEEK FUNCTION CONTROL PARAMETERS BASED ON OFF-TRACK WRITE EVENTS

(75) Inventors: Steven J. Alfred, Longmont, CO (US); Charles R. Watt, Jr., Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/740,420

(22) Filed: Apr. 26, 2007

(65) Prior Publication Data

US 2007/0253096 A1    Nov. 1, 2007

Related U.S. Application Data

(60) Provisional application No. 60/745,689, filed on Apr. 26, 2006.

(51) Int. Cl.
*G11B 27/36* (2006.01)
(52) U.S. Cl. .................................. 360/31; 360/78.04
(58) Field of Classification Search ................. None
See application file for complete search history.

(56) References Cited

U.S. PATENT DOCUMENTS

| | | | |
|---|---|---|---|
| 6,442,705 B1 | 8/2002 | Lamberts | |
| 6,570,733 B1 * | 5/2003 | Waugh et al. | 360/78.06 |
| 6,917,483 B2 * | 7/2005 | Gupta et al. | 360/31 |
| 6,975,468 B1 | 12/2005 | Melrose et al. | |
| 2004/0001278 A1 * | 1/2004 | Andress et al. | 360/78.06 |

\* cited by examiner

*Primary Examiner*—Jason C Olson
(74) *Attorney, Agent, or Firm*—David K. Lucente

(57) ABSTRACT

A rate of occurrence of off-track write events is determined. A seek function control parameter for a head is adaptively adjusted based on the determined rate of occurrence of the off-track write events. Related circuits and devices are also discussed.

29 Claims, 8 Drawing Sheets

Overshoot for Off-Track Write Events

| Head | WF+5% | WF+10% | WF +15% | WF+> 15% | Total Seeks |
|---|---|---|---|---|---|
| 0 | 1000 | 10 | 1 | 0 | 100,000 |
| 1 | 990 | 9 | 1 | 0 | 100,000 |
| 2 | 1015 | 10 | 1 | 0 | 100,000 |
| 3 | 879 | 7 | 0 | 0 | 78,000 |

132a → 0
132b → 1
132c → 2
132d → 3

Magnitude Data
330

*Figure 3A*

Seek Lengths for Off-Track Write Events Per Head

| Seek Length | WF+5% | WF+10% | WF +15% | WF+> 15% | Total Seeks |
|---|---|---|---|---|---|
| 0-2 | 1 | 0 | 0 | 0 | 100,000 |
| 3-10 | 100 | 0 | 0 | 0 | 10,000 |
| 10-100 | 50 | 0 | 0 | 0 | 5000 |
| 101-1000 | 10 | 6 | 2 | 0 | 1000 |
| 1001-10,000 | 8 | 0 | 0 | 0 | 800 |
| >10,000 | 5 | 0 | 0 | 0 | 500 |

Seek Length Data
335

*Figure 3B*

ADAPTIVELY ADJUSTING SEEK FUNCTION CONTROL PARAMETERS BASED ON OFF-TRACK WRITE EVENTS

RELATED APPLICATION

This application claims the benefit of and priority to U.S. Provisional Patent Application No. 60/745,689, filed Apr. 26, 2006, the disclosure of which is hereby incorporated herein by reference as if set forth in its entirety.

FIELD

The present invention generally relates to servo control, and more particularly, to controlling seek operations in data storage devices.

BACKGROUND

Disk drives are digital data storage devices which may allow host computers to store and retrieve large amounts of data in a fast and efficient manner. A typical disk drive may include a plurality of magnetic recording disks which are mounted to a rotatable hub of a spindle motor and rotated at a high speed. Information may be stored on each disk in concentric tracks. The data tracks are usually divided into sectors. Information may be written to and/or read from a storage surface(s) of a disk by a transducer or head. The head may include a read element separate from a write element, or the read and write elements may be integrated into a single read/write element. The head may be mounted on an actuator arm that may be capable of moving the head radially over the disk. Accordingly, the movement of the actuator arm may allow the head to access different data tracks. The disk may be rotated by the spindle motor at a relatively high speed, which may allow the head to access different sectors within each track on the disk.

The actuator arm may be coupled to a motor or coarse actuator, such as a voice coil motor (VCM), to move the actuator arm such that the head moves radially over the disk. Operation of the coarse actuator may be controlled by a servo control system. The servo control system generally performs two distinct functions: seek control and track following. The seek control function includes controllably moving the actuator arm such that the head is moved from an initial position to a target track position. A seek may consist of an acceleration stage, a deceleration stage, and a settle stage. In general, the seek function may be initiated when a host computer associated with the disk drive issues a seek command to read data from or write data to a target track on the disk.

As the head approaches the target track, the servo control system may initiate the settle stage to bring the head to rest over the target track within a selected settle threshold or "window", which may be based on a percentage of the track width from the center of the track. An algorithm may be employed during settle to ensure the head is positioned on the target track with sufficient accuracy to write. This process may typically require counting servo position samples occurring within the settle window. For example, a write gate may be enabled after 10 consecutive positioning samples are observed within a window of +/−10 percent of a data track. A wide variety of settle criteria may be employed, and may take into account a tradeoff between seek time and positioning accuracy. Thereafter, the servo control system may enter the track following mode, where the head is maintained at a desired position with respect to the target track (e.g., over a centerline of the track) until desired data transfers are complete and another seek is performed.

Large off-track write events may lead to unrecoverable errors, also referred to herein as "hard" errors. A write fault gate may be used to terminate write events that exceed a predetermined write fault limit or threshold value. The write fault threshold may be based on a predetermined radial distance between the head and the centerline of a track, which may be determined via tolerance analysis of head parameters, positioning accuracy (for example, based on track misregistration), and/or estimates of overshoot. "Overshoot" may refer to the amount by which an off-track event exceeds the write fault threshold value. The overshoot value may depend on the acceleration and/or velocity of the head.

However, because sampled servo systems may receive position data at fixed time intervals based on the servo position samples on the disk surface, an off-track write event may exceed the write fault threshold value during a time between samples such that the write fault gate may not immediately terminate the write event. Such an off-track write event may be referred to as a write-fault-gate-plus-overshoot (WFGPO) event. Position/velocity/acceleration algorithms may be used to detect the occurrence and/or magnitudes of such write events, for example, based on pre-fault and post-fault position, velocity, and/or acceleration data for the head. However, if the head moves off-track by more than a predetermined amount of overshoot while writing a track, damaging encroachment on adjacent tracks may occur.

In particular, large WFGPO events may occur shortly after a seek event. More particularly, structural resonances of the head stack assembly (HSA) may be excited by the seek current, which may cause transient vibrations during the settle stage. Also, transient seek dynamics may cause rapid positioning error events to occur shortly after a settle. For example, for three adjacent tracks A, B, and C, a worst case may occur if middle track B experiences a WFGPO event from both outer track A and track C, and the events are circumferentially aligned such that a single data sector of track B is encroached or "squeezed" from both sides. This may be referred to as a double-sided squeeze event. Some read/write systems may tolerate about a 20%-25% double-sided squeeze and/or about a 40%-50% single-sided squeeze before realizing a hard error. Furthermore, as track pitch decreases (i.e., as tracks-per-inch (tpi) increases), the read/write system may become more susceptible to off-track write events because the magnitude of the WFGPO events may not necessarily decrease in proportion with the track pitch.

SUMMARY

According to some embodiments, a method includes determining a rate of occurrence of an off-track write event. A seek function control parameter for a head is adaptively adjusted based on the determined rate of occurrence of the off-track write event.

According to other embodiments, a circuit includes a controller that determines a rate of occurrence of off-track write events. The controller adaptively adjusts a seek function control parameter for a head when the determined rate of occurrence of the off-track write events exceeds a desired rate of occurrence for off-track write events.

According to still other embodiments, a disk drive includes a rotatable data storage disk, a head that is adjacent to the rotatable storage disk, and a controller. The controller determines a rate of occurrence of off-track write events, and adaptively adjusts a seek function control parameter for the head based on the determined rate of occurrence of the off-track write events.

Other methods, devices, and/or computer program products according to some embodiments will become apparent to one with skill in the art upon review of the following drawings and detailed description. It is intended that all such additional methods, devices, and/or computer program products be included within this description, be within the scope of the invention, and be protected by the accompanying claims.

DESCRIPTION OF THE DRAWINGS

FIGS. 3A and 3B are tables illustrating accumulated positioning data for multiple heads in a disk drive according to some embodiments.

DETAILED DESCRIPTION

Figure 1B:
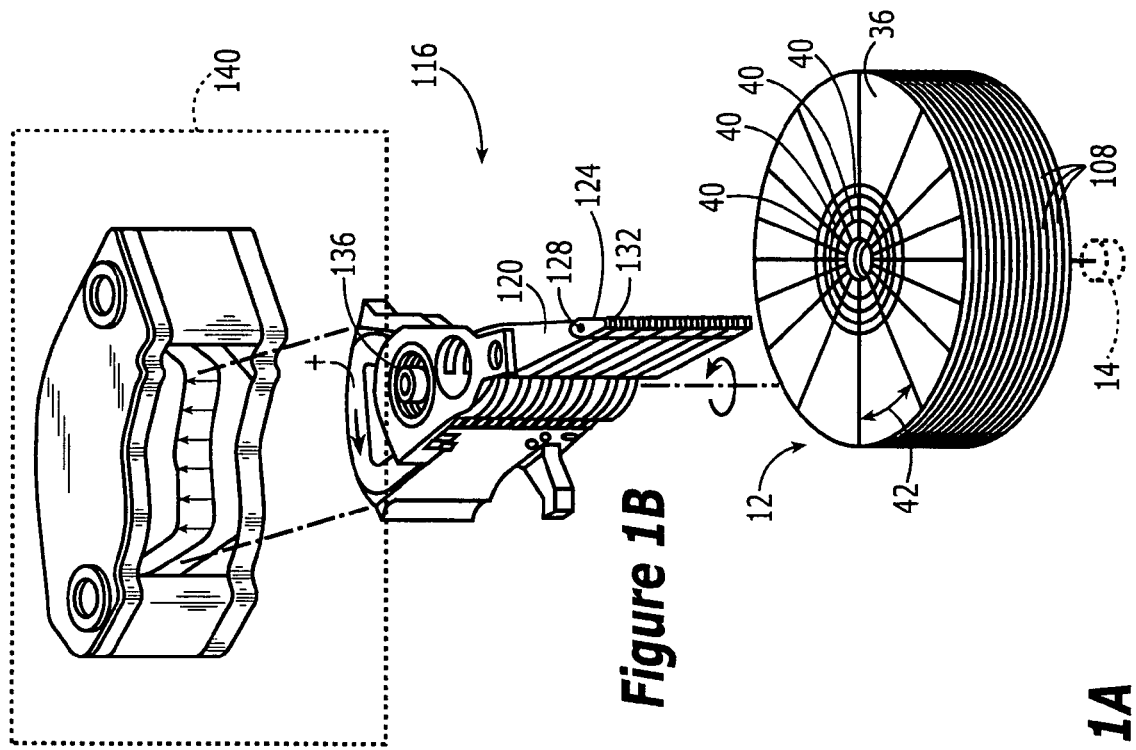
FIG. 1B is an exploded view of portions of the disk drive of FIG. 1A.

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Some embodiments of the present invention may be used to reduce the probability of large single-sided squeeze events by monitoring the rate of occurrence of off-track write events. More particularly, the rate of occurrence of off-track events that exceed a desired threshold may be determined, and seek function control parameters and/or write-fault parameters may be adaptively adjusted based on the rate of occurrence. For example, the off-track write events may exceed the write fault threshold by an overshoot amount, also referred to hereinafter as write-fault-gate-plus-overshoot (WFGPO) events. As such, the probability of occurrence of large WFGPO events may be reduced, which may improve data integrity. The seek function control parameters may include seek current profiles, seek controller parameters, and/or settle criteria, and may be adjusted on a per-head basis so that a single problematic head may have a more limited effect on the overall performance of a drive that includes multiple heads. In addition, some embodiments may allow the use of a wider range of head tolerances for heads that may have previously failed testing in the manufacturing stage due to insufficient squeeze capability, which may improve yield in manufacturing.

Figure 1A:
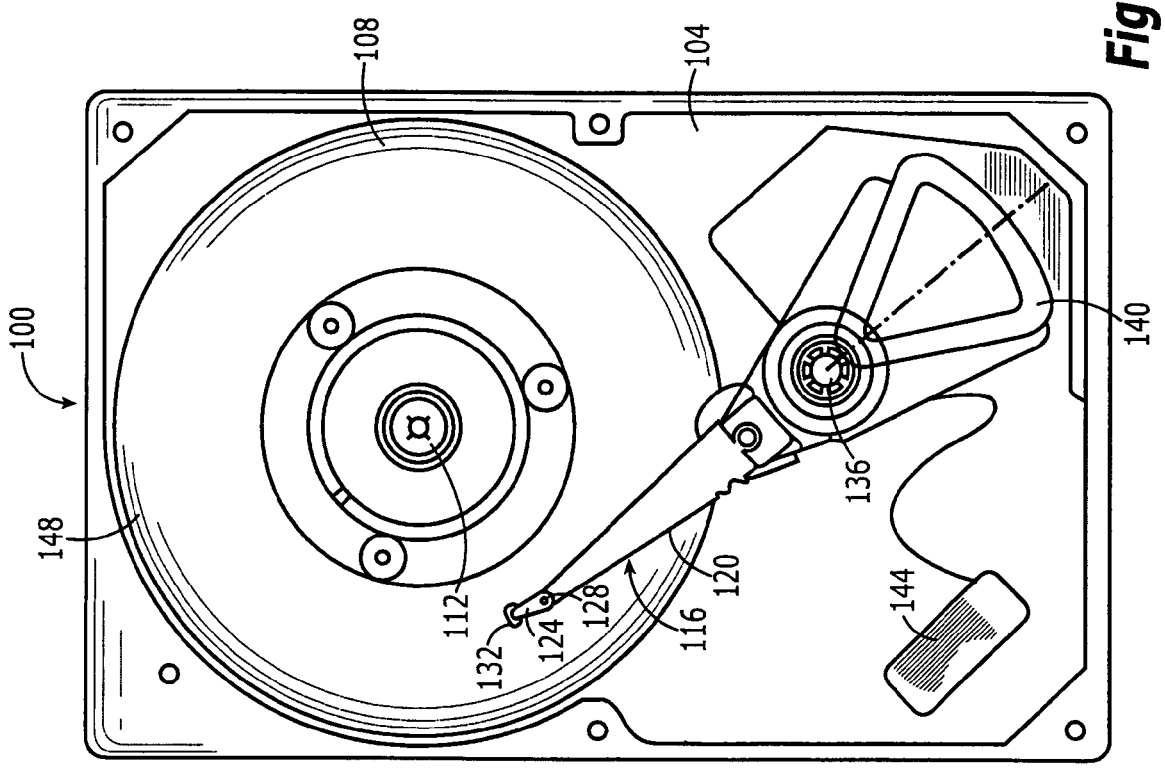
FIG. 1A is a plan view of a disk drive including electronic circuits that are configured in accordance with some embodiments

FIG. 1A illustrates a simplified diagrammatic representation of a disk drive. The disk drive, generally identified by reference number 100, includes a base 104 and one or more data storage disks 108 (only one of which is shown in FIG. 1A). The disk 108 may be a magnetic disk, an optical disk, or any other type of data storage disk, and may have data storage tracks defined on one or both of its storage surfaces. The disk 108 is interconnected to the base 104 by a spindle motor (not shown) mounted within or beneath a hub 112, such that the disk 108 can be rotated relative to the base 104.

An actuator arm assembly 116 includes a first member 120 and a second member 124. The first member 120 is coupled between the base 104 and the second member 124, and the members 120 and 124 can provide two stages of movement. Interconnecting the first stage 120 and the second stage 124 of the actuator arm assembly 116 is a micro actuator 128. A head (or transducer) 132 is mounted on a distal portion of the actuator arm assembly 116. In particular, the head 132 can be coupled to an end of the second member 124 of the actuator arm assembly 116 so that it can be positioned adjacent to a storage surface of the disk 108. The head 132 may, for example, include a magnetoresistive (MR) element and/or a thin film inductive (TFI) element.

The first member 120 of the actuator arm assembly 116 can be interconnected to the base 104 by a bearing 136. A coarse actuator 140 can pivot the actuator arm assembly 116 about the bearing 136 to position the micro actuator 128 and, thereby, position the head 132 with respect to the disk 108. In particular, the coarse actuator 140 positions the head 132 to allow it to access different data tracks or cylinders 148 on the disk 108. Accordingly, the coarse actuator 140 can position the micro actuator 128 and, thereby, the head 132 over a range of movement that may correspond to the distance between an inner and outer data storage track of the storage surface of the disk 108. The coarse actuator 140 may be, for example, a motor, such as a voice coil motor (VCM).

The articulation of the second member 124 with respect to the first member 120 of the actuator arm assembly 116 may be achieved, for example, by providing a journal bearing as part of the micro actuator 128, by providing a flexible interconnection between the second member 124 and the first member 120, or by otherwise joining the second member 124 to the first member 120 in such a way that the second member 124 is allowed to move with respect to the first member 120.

The micro actuator 128 can position the head 132 relative to the disk 108 over a range of movement that is less than the range of movement provided by the coarse actuator 140. As such, the micro actuator 128 may affect finer positioning and/or higher frequency movements of the head 132 within its range of movement (e.g., over relatively short distances), such as that which may be encountered during shorter seek lengths (e.g., a few tracks) or during track following. Accordingly, the micro actuator 128 may move the head 132 faster across the disk 108, within its range of movement, than may be possible with the coarse actuator 140. In some embodiments, the second member 124 may be eliminated by directly connecting the head 132 to a surface or extension of the micro actuator 128. The micro actuator 128 may employ any mechanism capable of moving the head 132 relative to the disk 108, such as by adjusting the second member 124 of the actuator arm assembly 116 with respect to the first member 120. For example, the micro actuator 128 may be a piezoelectric actuator, an electromagnetic actuator, or an electrostatic actuator.

FIG. 1B is an exploded view further illustrating portions of the disk drive 100 of FIG. 1A. Referring now to FIG. 1B, a disk stack 12 typically includes a plurality of disks 108, each of which may have a pair of disk surfaces 36. The disks 108 are mounted on a cylindrical shaft and are rotated about an axis by the spindle motor 14. Data is stored on the disks 108 within a number of substantially concentric tracks 40 (or cylinders). Each track 40 is divided into a plurality of circumferentially extending sectors 42. Each sector is further divided into a plurality of data sectors defined between adjacent servo spokes. The servo spokes are used to, among other things, accurately position the head 132 so that data can be properly written onto and read from a selected track. The data sectors may be used to store and retrieve non-servo related data (i.e., host device data).

Still referring to FIG. 1B, the actuator arm assembly 116 includes a plurality of first and second members 120 and 124, micro actuators 128, and heads 132. Each head 132 is mounted to a corresponding one of the second members 124, and is positioned to be adjacent to a different one of the disk surfaces 36. The coarse actuator 140 and the micro actuators 128 respectively operate to move the first and second members 120 and 124 of the actuator arm assembly 116 to thereby move the heads 132 across their respective disk surfaces 36. The heads 132 are configured to fly on an air cushion relative to the data recording surfaces 36 of the rotating disks 108 while writing data to the data recording surface responsive to a write command from a host device or while reading data from the data recording surface to generate a read signal responsive to a read command from the host device.

Referring again to FIG. 1A, a controller 144 is coupled to the actuator arm assembly 116. The controller 144 can control movement of the head 132 relative to the disk 108 via the coarse actuator 140 and/or the micro actuator 128. More particularly, the controller 144 may control the coarse actuator 140 and the micro actuator 128 to position the head 132 along a desired data storage track of the disk 108. The controller 144 moves the head 132 in two primary modes: a seek mode and a track following mode. During the seek mode, the controller 144 can be configured to move the head 132 from an initial track to a target track on the disk 108 for which the host device has requested access using the coarse actuator 140, the micro actuator 128, and/or a combination thereof. During the track following mode, the controller 144 can control the coarse actuator 140 and the micro actuator 128 to position and maintain the head 132 over a defined radial location along a track on the disk. The controller 144 may include read/write channel circuits and/or other associated analog circuitry and/or digital circuitry, such as a gate array and/or microprocessor-based instruction processing device. Accordingly, in some embodiments, the controller 144 may determine a rate of occurrence of off-track write events for the head 132, and may adaptively adjust seek function control parameters for the head 132 based on the determined rate of occurrence, as discussed in greater detail below.

Figure 2A:
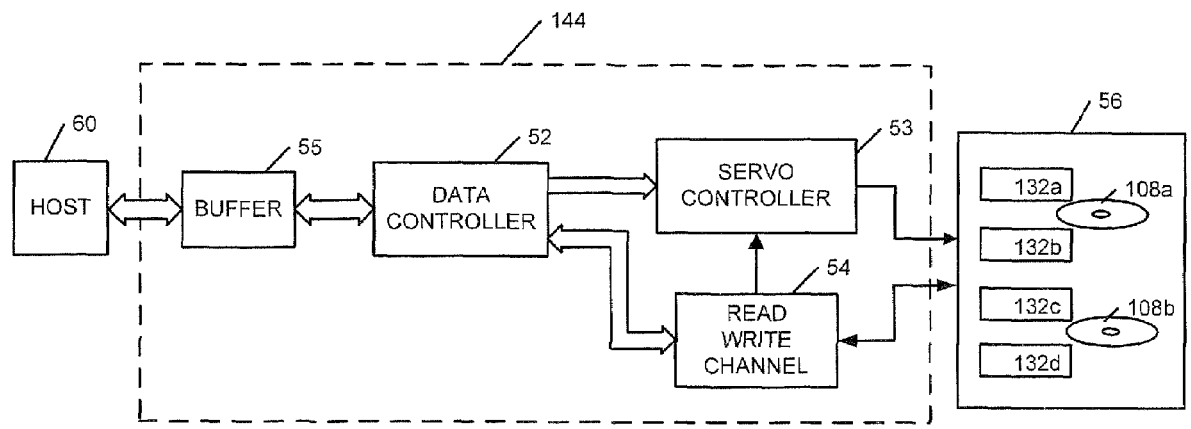
FIG. 2A is a block diagram illustrating a controller in a disk drive according to some embodiments.
Figure 2B:
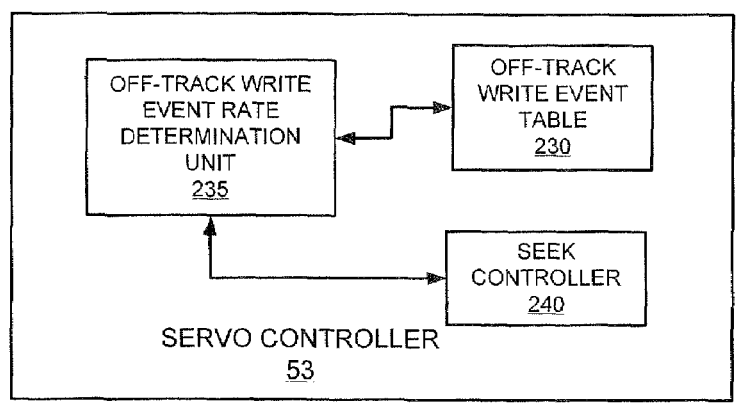
FIG. 2B is a block diagram further illustrating a servo controller in a disk drive according to some embodiments.

FIGS. 2A and 2B are block diagrams further illustrating the controller 144 of FIG. 1A. As shown in FIG. 2A, the controller 144 can include a data controller 52, a servo controller 53, a read write channel 54, and a buffer 55 that is configured to receive instructions/commands from a host device 60. Although the controllers 52 and 53, the buffer 55, and the read write channel 54 have been shown as separate blocks for purposes of illustration and discussion, it is to be understood that their functionality as described herein may be integrated within a common integrated circuit package or distributed among more than one integrated circuit package. The head stack assembly (HSA) 56 can include a plurality of the disks 108a-b, a plurality of heads 132a-132d mounted to the actuator arm assembly 116 and positioned adjacent to different data storage surfaces of the disks 108a-b, and the spindle motor 14.

Write commands and associated data from the host device 60 are buffered in the buffer 55. The data controller 52 carries out buffered write commands by formatting the associated data into blocks with the appropriate header information, and transferring the formatted data from the buffer 55, via the read/write channel 54, to data sectors along one or more tracks on the disk 108a-b identified by the associated write command.

The read write channel 54 can operate in a conventional manner to convert data between the digital form used by the data controller 52 and the analog form conducted through the heads 132a-132d in the HSA 56. The read write channel 54 also provides servo positional information read from the HSA 56 to the servo controller 53. More particularly, servo sectors on each of the disks 108a-b can include head location information, such as a track identification field and data block address, for identifying a target track and data block, and burst fields to provide servo fine location information. The head location information is induced into one or more of the heads 132a-132d, converted from analog signals to digital data in the read/write channel 54, and transferred to the servo controller 53. The servo positional information can be used to detect the location of the heads 132a-132d in relation to target data sectors on the disks 108a-b. The servo controller 53 can use target data sectors from the data controller 52 and the servo positional information to seek the heads 132a-132d to an addressed target track and data sector on the disks 108a-b, and to maintain the heads 132a-132d aligned with the target track while data is written/read on one or more identified data sectors.

The servo controller 53 may rely on a variety of seek function control parameters to ensure the heads 132a-132d are positioned on the target track with sufficient accuracy to write upon completion of a seek operation. For example, the seek function control parameters may specify a settle window based on a predetermined amount of time and/or a percentage of the width of the target track within which a particular number of servo position samples should occur in order to complete the seek operation. For instance, after 10 consecutive positioning samples are observed within a window of +/−10 percent of a data track, the servo controller 53 may enable a write gate to allow data to be written to the target track. Additionally and/or alternatively, the servo controller 53 may enable the write gate after a predetermined amount of time based on the settle window.

Accordingly, the servo controller 53 may determine a rate of occurrence of off-track write events. In some embodiments, the off-track write events may exceed a write fault threshold by an overshoot amount, also referred to herein as write-fault-gate-plus-overshoot (WFGPO) events. FIG. 2B further illustrates the servo controller 53 of FIG. 2A in greater detail. As shown in FIG. 2B, the servo controller 53 may include an off-track write event rate determination unit 235, an off-track write event table 230, and a seek controller 240. The servo controller 53 may accumulate data for a plurality of off-track write events, and may store the data in the off-track write event table 230. The accumulated data may include, for example, the magnitudes and/or overshoot amounts of the off-track write events relative to the write fault threshold, a total number of seek operations performed, and/or seek lengths indicating the respective radial distances between an initial track and a target track for each seek operation. For instance, the servo controller 53 may generate a position error signal based on a read signal from a head 132a indicating changes in radial location of the head 132a relative to a centerline of a target track, and may determine magnitude data for the off-track write events from the position error signal. The servo controller 53 may accumulate and store such data for each of the heads 132a-132d in the table 230.

As such, based on the accumulated data, the off-track write event rate determination unit 235 may calculate the rate of occurrence of off-track write events having a specific magnitude relative to seek length and/or total number of seek operations for a particular one of the heads 132a-132d. The servo controller 53 may thereby adaptively adjust current seek function control parameters for the corresponding one of the heads 132a-132d based on the determined rate of occurrence via the seek controller 240. For example, the seek controller 240 may modify one or more seek function control parameters for head 132a if the determined rate of occurrence of an off-track write event having a magnitude of 20% or more of the track width exceeds a desired rate of occurrence, such as $1e^{-6}$. More particularly, the rate of occurrence of WFGPO events at $1e^{-6}$ may be important in some embodiments because, at such a rate, a double-sided squeeze event may occur at a rate of about $1e^{-12}$, which approaches a maximum hard error rate ($1e^{-14}$) allowed by many disk drive manufacturers. A typical read/write system may tolerate a double-sided squeeze of about 15% of the track width. Also, a typical off-track capability/track misregistration (OTC/TMR) design point may allow for WFGPO events having a magnitude of about 20% of the track width (for example, corresponding to a double-sided squeeze-to-dead capability where data written off-track may be unrecoverable) occurring at a rate of about $1e^{-6}$.

FIGS. 3A and 3B illustrate examples of accumulated data and associations with the beads 132a-132d that may defined within the off-track write event table 230 and stored in the servo controller 53 according to some embodiments. As shown in FIG. 3A, the servo controller 53 may record magnitude data for a plurality of off-track write events in a table 330. More particularly, the servo controller 53 records the magnitudes of the off-track write events as overshoot amounts relative to a write fault threshold WF, and maintains counts for several WFGPO overshoot intervals. As illustrated in FIG. 3A, the occurrence of off-track write events having overshoots of 5%, 10%, 15%, and greater than 15% are recorded in the table 330 for each of four heads 0, 1, 2, and 3 (corresponding to the heads 132a, 132b, 132c, and 132d, respectively). Also, a total number of seek operations performed per-head are recorded in the table 330. Accordingly, a rate of occurrence of an off-track write event having a particular magnitude or overshoot amount may be determined based on the accumulated data stored in the table 330. For example, the rate of occurrence of off-track write events having an overshoot of about 15% may be determined to be about 1 out of every 100,000 seeks for head 132a by dividing the number of recorded off-track write events having magnitudes of WF+15% by the total number of seeks performed. In addition, the rate of occurrence of a off-track write event having a particular magnitude may be estimated based on extrapolation of the accumulated data. More particularly, although the $1e^{-6}$ rate of occurrence of off-track write events having an overshoot of about 15% may not be directly determined from the accumulated data for head 132a in the table 330 due to insufficient sample size, it may be extrapolated using well-known techniques based on the accumulated data for 100,000 seek operations. As such, the off-track write event rate determination unit 235 may estimate the rate of occurrence of off-track write events having a given amplitude before accumulating enough seek data to directly measure the rate.

Similarly, as shown in FIG. 3B, the servo controller 53 may record seek length data corresponding to a plurality of off-track write events in a table 335. The seek length data may indicate a number of tracks between an initial track and a target track corresponding to the respective seek operations. More particularly, the servo controller 53 records seek lengths (in units of tracks) corresponding to off-track write events based on several seek length intervals between an initial and a target track. As illustrated in FIG. 3B, the occurrence of off-track write events having overshoots of 5%, 10%, 15%, and greater than 15% for several seek length ranges covering from 0 to more than 10,000 tracks for head 132a are recorded in the table 335. Similar tables may be maintained for the remaining heads 132b-132d on a per-head basis. Accordingly, the off-track write event rate determination unit 235 may determine a rate of occurrence of off-track write events as a function of seek length based on the accumulated data stored in the table 335. For example, as shown in FIG. 3B, the rate of occurrence of an off-track write event having an overshoot of about 10% for head 132a may be determined to be about 6 out of 1000 seeks in the 101-1000 track seek length range. The rate of occurrence of off-track write events relative to seek lengths may also be estimated for rates beyond the sample size of the data of table 335 based on extrapolation of the accumulated seek length data in a manner similar to that discussed above with reference to FIG. 3A.

Figure 4A:
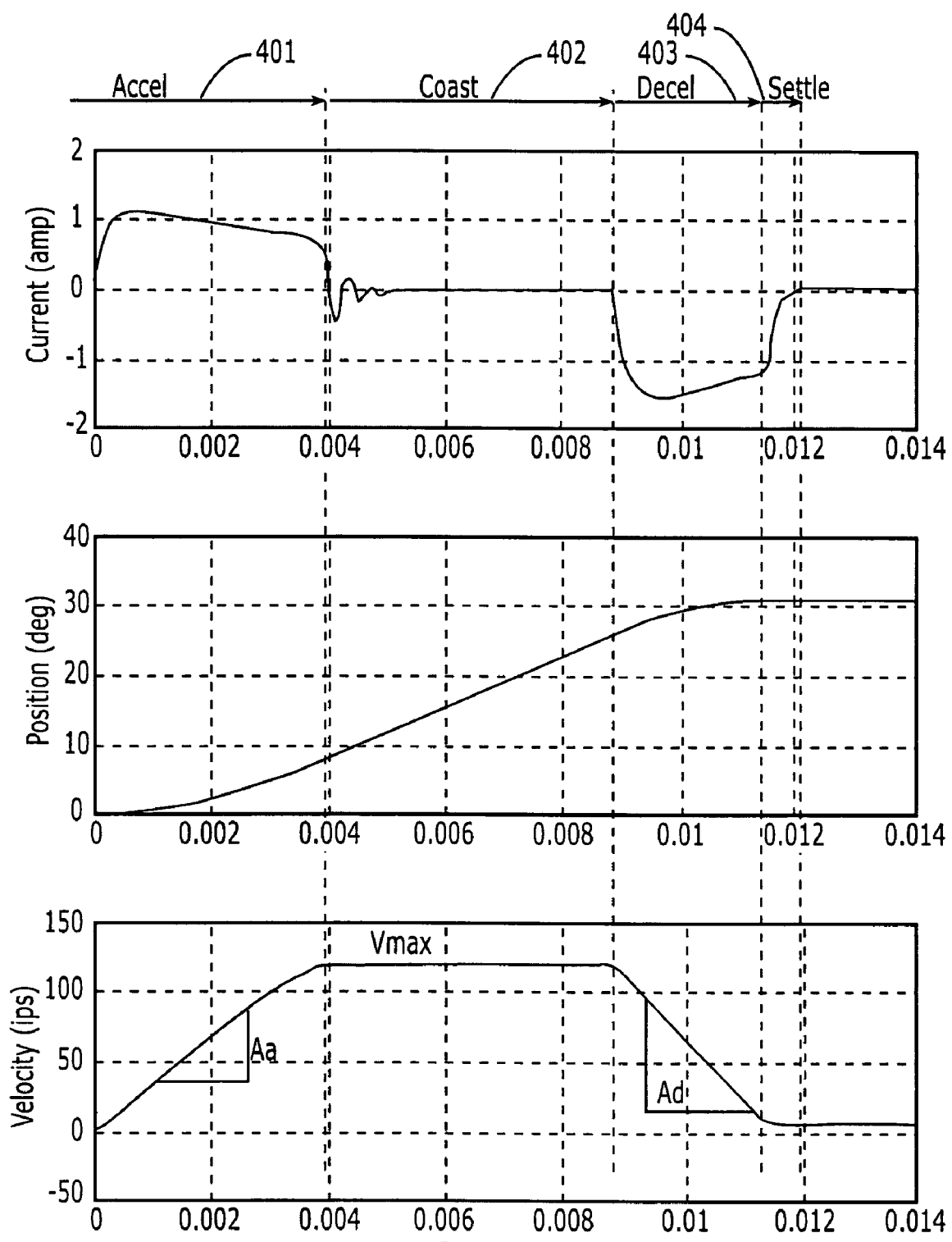
FIG. 4A is a series of graphs illustrating seek current, head position, and head velocity for a head in a disk drive according to some embodiments.
Figure 4B:
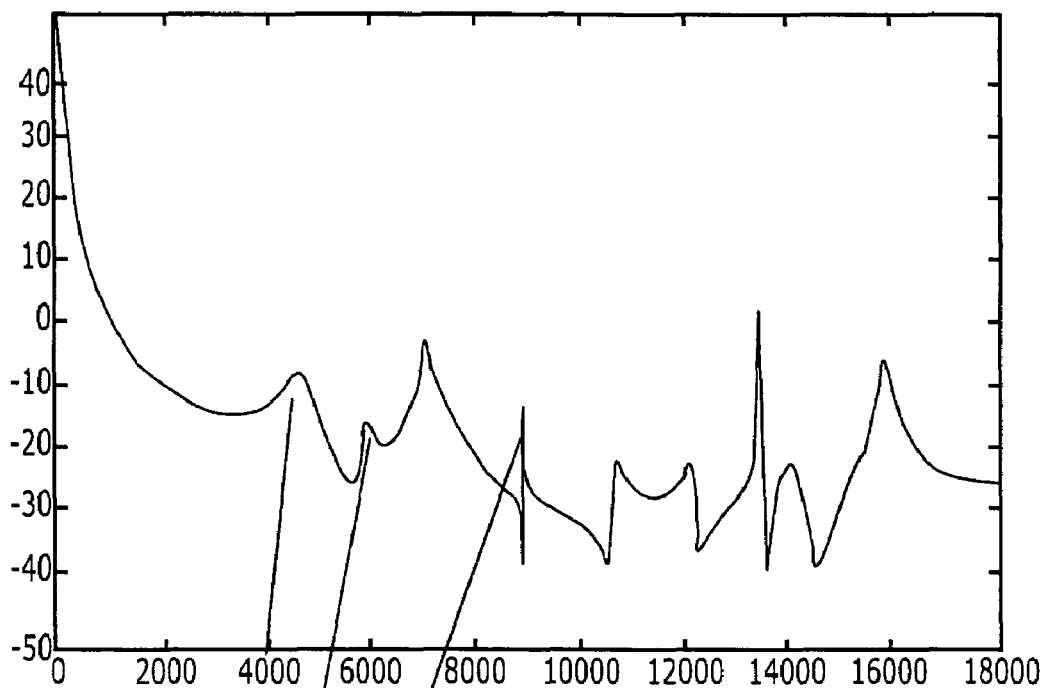
FIG. 4B is a graph illustrating a transfer function for a head in a disk drive according to some embodiments.
Figure 4C:
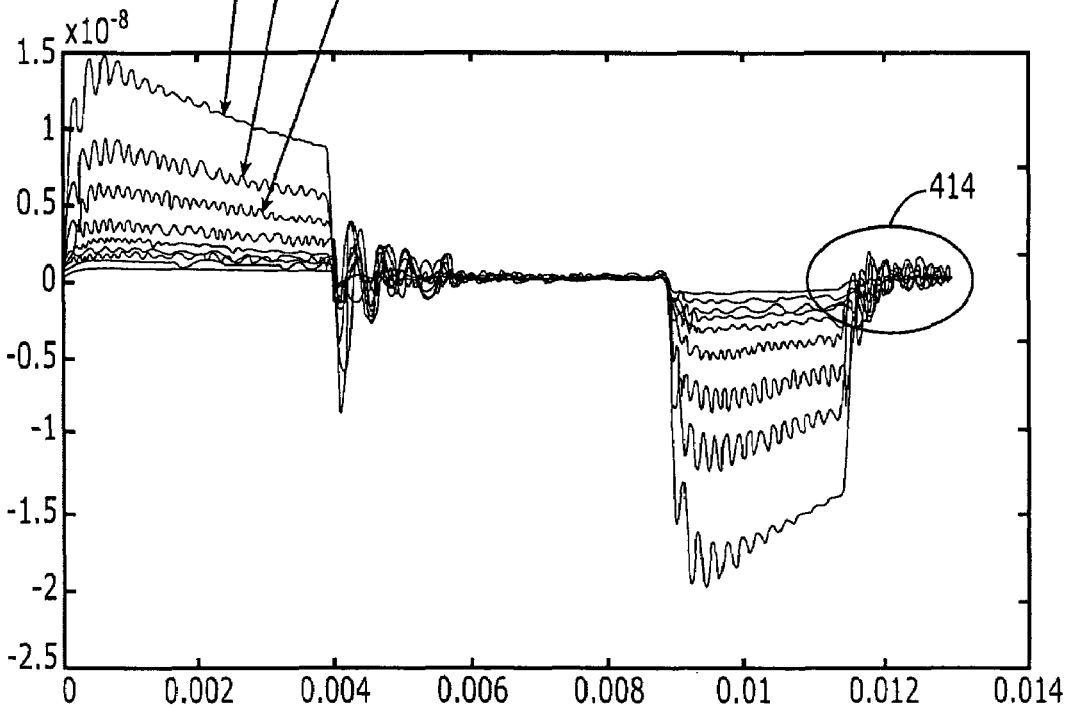
FIG. 4C is a graph illustrating transient settle responses for a head in a disk drive according to some embodiments.
Figure 4D:
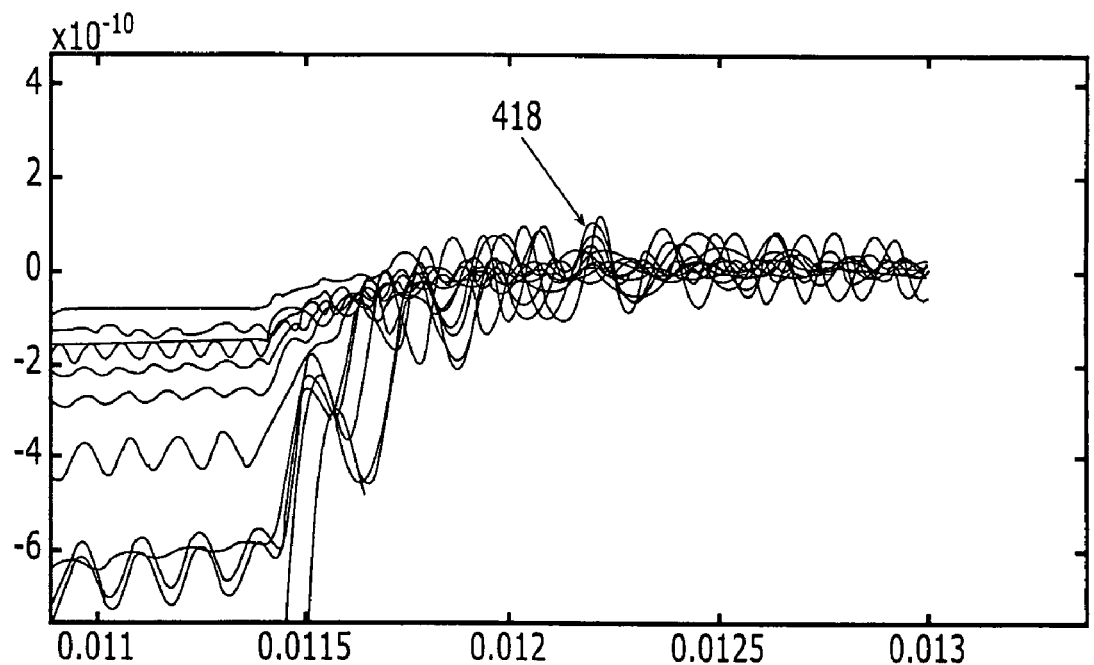
FIG. 4D is a graph illustrating an enlarged portion of the graph of FIG. 4C.

In addition, in some embodiments, the servo controller 53 may predict a rate of occurrence of off-track write events. More particularly, the off-track write event rate determination unit 235 may predict the rate of occurrence of off-track write events based on a transfer function of a particular head and an estimated seek current. FIG. 4A illustrates an example of a seek current and the corresponding head displacement and head velocity versus time for a seek operation according to some embodiments. As shown in FIG. 4A, the seek operation includes an acceleration stage 401, a coast stage 402, a deceleration stage 403, and an arrival or settle stage 404 over a seek time of about 0.012 seconds. Writing to a target track may be enabled after completion of the settle stage 404 of the seek operation. FIG. 4B illustrates a transfer function for a head stack assembly (HSA) according to some embodiments. In particular, FIG. 4B illustrates the position response of the HSA over a frequency range of about 0 Hz to about 18 kHz. The "peaks" shown in FIG. 4B correspond to modes of vibration of the HSA. Accordingly, using the seek current profile of FIG. 4A and the transfer function of FIG. 4B, the off-track write event rate determination unit 235 may estimate a transient settle response for one or more modes of vibration of the HSA, as illustrated in FIG. 4C. For example, the off-track write event rate determination unit 235 may convolve the transfer function of FIG. 4B with the seek current profile of FIG. 4A to compute the transient settle responses of FIG. 4C. The arrows 415, 416, and 417 indicate the correlation between the modes of vibration of FIG. 4B and the settle responses of FIG. 4C. FIG. 4D is an enlarged view of a portion 414 of FIG. 4C illustrating the transient settle responses of the modes of vibration during the settle stage of the seek operation of FIG. 4A. As shown in FIG. 4D, the transient settle responses of several modes may align during the settle stage, as indicated by arrow 418. Accordingly, as large WFGPO events may often occur shortly after a seek operation, the servo controller 53 may use the alignment of one or more of the settle responses to predict the occurrence of off-track write events. In other embodiments, the operations for predicting the occurrence of off-track write events discussed above with reference to FIGS. 4A-4D may be performed by an external processor, for example, during a design stage using simulation information and/or during a manufacturing process.

Figure 5:
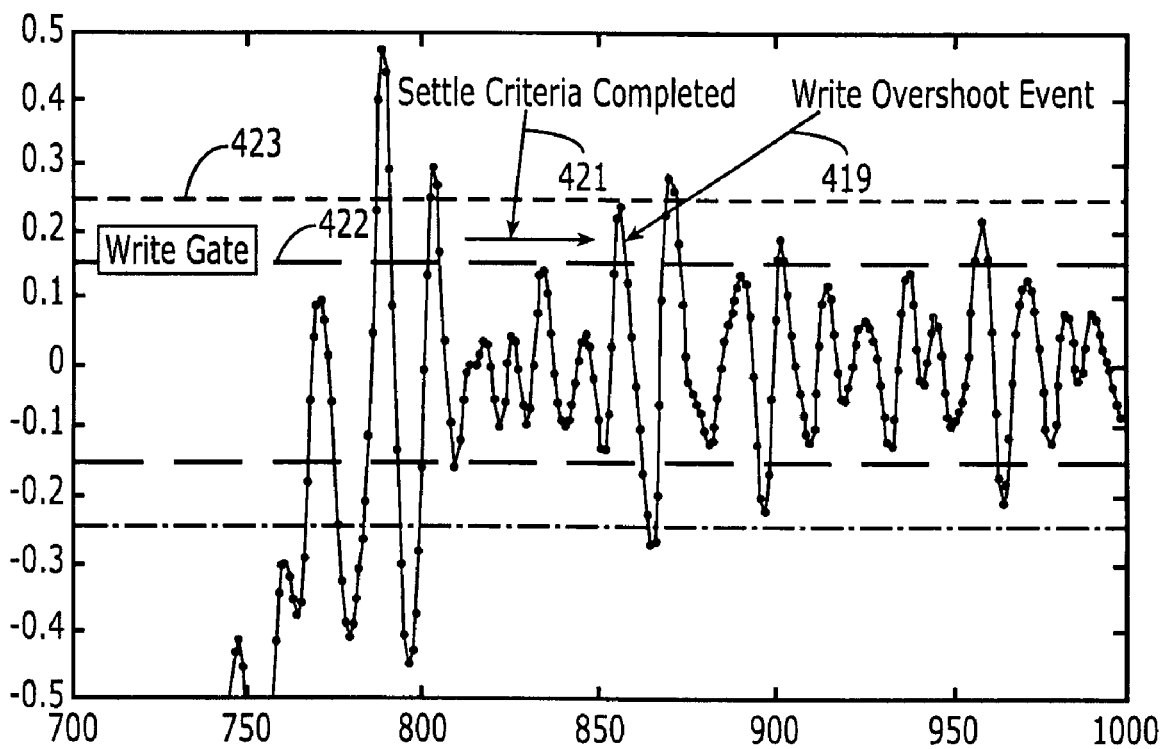
FIG. 5 is a graph illustrating the occurrence of off-track write events for a head in a disk drive according to some embodiments.

Based on the determined rate of occurrence of off-track write events (for example, using the techniques illustrated in FIGS. 3A-3B and/or 4A-4D), the servo controller 53 may adaptively adjust one or more current seek function control parameters for the heads 132a-132d. FIG. 5 illustrates the occurrence of off-track write events immediately following completion of the settle stage of the seek operation. More particularly, as shown in FIG. 5, an off-track write event 419 having an amplitude of about 21% occurs shortly after a settle stage 421 has completed in a system having a write fault threshold 422 of about 15%. However, the off-track write event 419 does not exceed a write-fault-gate-plus overshoot (WFGPO) threshold 423 (also referred to herein as an overshoot threshold) of about 25%. In some embodiments, the overshoot threshold 423 may be determined based on the squeeze capability of the corresponding head. As used herein, the "squeeze capability" of a head may refer to the percentage of the track width by which the head may move relative to the center of a target track and/or by which an adjacent track may encroach the target track before unrecoverable or "hard" write errors may occur.

Accordingly, if the off-track write event rate determination unit 235 determines that the rate of occurrence of off-track write events having magnitudes greater than the squeeze capability exceeds a desired rate of occurrence, the seek controller 240 may adaptively adjust one or more current seek function control parameters for the heads 132a-132d to increase accuracy in positioning the heads 132a-132d. For example, the seek controller 240 may increase the number of servo sample counts that may be required to complete the settle stage of the seek operation. In addition, the seek controller 240 may adjust the settle window to a reduced percentage of the width of the data track for observing servo samples and/or to an increased amount of time. Furthermore, the seek controller 240 may modify the number of required servo counts per window, for example, using an increment/decrement/hold settle scheme. As a further example, the seek controller 240 may adaptively adjust one or more of the acceleration 401, coast 402, deceleration 403, and/or settle 404 stages of the seek current profile (as illustrated in FIG. 4A) based on the determined rate of occurrence of the off-track write events. More particularly, the seek controller 240 may change the shape of the seek trajectory, modify the desired position versus time profile, and/or alter controller parameters such as gain settings and/or filter coefficients within a control algorithm. Similarly, the seek controller 240 may adaptively adjust the current seek function control parameters based on the determined rate of occurrence of off-track write events at particular seek length ranges. For example, if the rate of occurrence of WFGPO events at a relatively long seek length exceeds a desired rate of occurrence, the seek controller 240 may increase the number of servo sample counts and/or adjust the settle window for seek operations having such a seek length.

However, restricting the settle parameters to ensure more accurate positioning of a head may also increase the average seek time for that head. For example, increasing the number of servo sample counts required to complete a seek operation may increase the duration of the seek operation. Accordingly, in some embodiments, it may be desirable to modify a seek time table that may be used by I/O operation reordering algorithms to account for the increased seek time when the settle parameters are modified. Also, where off-track write event rate determination unit 235 has estimated the off-track write rate, for example, based on the extrapolation and/or prediction techniques described above, the seek controller 240 may adjust the current settle parameters in advance, thereby reducing and/or preventing the occurrence of large off-track write events.

The seek controller 240 may also separately adjust respective seek function control parameters for each of the heads 132a-132d on a per-head basis based on the corresponding rate of occurrence of an off-track write event for that head. Furthermore, the seek controller 240 may separately adjust the overshoot threshold 423 and/or the write fault threshold 422 for the heads 132a-132d on a per-head basis, for example, to more accurately calibrate triggers for position/velocity/acceleration algorithms used to detect the occurrence and/or magnitudes of off-track write events.

For example, in some embodiments, the seek controller 240 may set the overshoot threshold 423 based on actual head performance as measured during manufacturing testing. More particularly, the servo controller 53 may measure the single-sided squeeze capability (i.e., the squeeze capability when squeezed at one side of a track) for a particular head 132a during manufacturing testing, and the seek controller 240 may adaptively adjust the overshoot threshold 423 and/or other seek function control parameters for the head 132a based on the measured squeeze capability. The servo controller 53 may also measure (or extrapolate) the average magnitude of an off-track write event at a desired rate of occurrence, such as $1e^{-6}$. Accordingly, if the average magnitude of the off-track write event is greater than the measured squeeze capability, the seek controller 240 may modify one or more seek function control parameters for the head 132a. For example, as discussed above, the seek controller 240 may increase the number of servo counts required for completion of the seek operation, adjust the settle window, and/or modify an increment/decrement/hold settle scheme for the head 132a. Similarly, the seek controller 240 may modify the seek current profile and/or internal gain settings and/or filter coefficients. Also, the seek controller 240 may modify write fault thresholds and/or overshoot thresholds for each of the remaining heads 132b-132d based on their respective squeeze capabilities. Matching the squeeze capabilities and write fault, overshoot, and/or seek function control parameters on a per-head basis may allow the use of heads that previously failed testing for double-sided squeeze capability (i.e., the squeeze capability when squeezed at both sides of a track), which may improve head yield in manufacturing.

In addition, in some embodiments, the servo controller 53 may adaptively adjust the write fault, overshoot, and/or current seek function control parameters during field operation of a disk drive based on the respective minimum single-sided squeeze capabilities of each of the heads 132a-132d. The squeeze capabilities may be determined based on average or expected values for all of the heads 132a-132d and/or based on the particular capabilities of each individual head, for example, as measured during manufacturing testing. For instance, the off-track write event rate determination unit 235 may compute or estimate the rate of occurrence of off-track write events having magnitudes greater than or equal to the squeeze capability of a particular head 132a, and the seek controller 240 may modify the seek function control parameters for the head 132a if the rate of occurrence of off-track write events having magnitudes exceeding the squeeze capability of the head 132a is greater than a desired rate of occurrence, such as $1e^{-6}$. More particularly, as discussed above, the seek controller 240 may increase the number of servo sample counts for completion of the seek operation, adjust the settle window, and/or modify an increment/decrement/hold settle scheme for the head 132a. Similarly, the servo controller 53 may modify write fault, overshoot, and/or current seek function control parameters for each of the remaining heads 132b-132d if the rate of occurrence of off-track write events exceeding their respective squeeze capabilities is greater than the desired rate of occurrence. Also, the servo controller 53 may erase or reset the accumulated data in the table 230 (for example, as illustrated in FIGS. 3A and 3B) for each of the heads 132a-132d responsive to modifying the respective seek function control parameters, and may begin accumulating new data based on the modified seek function control parameters.

Figure 6:
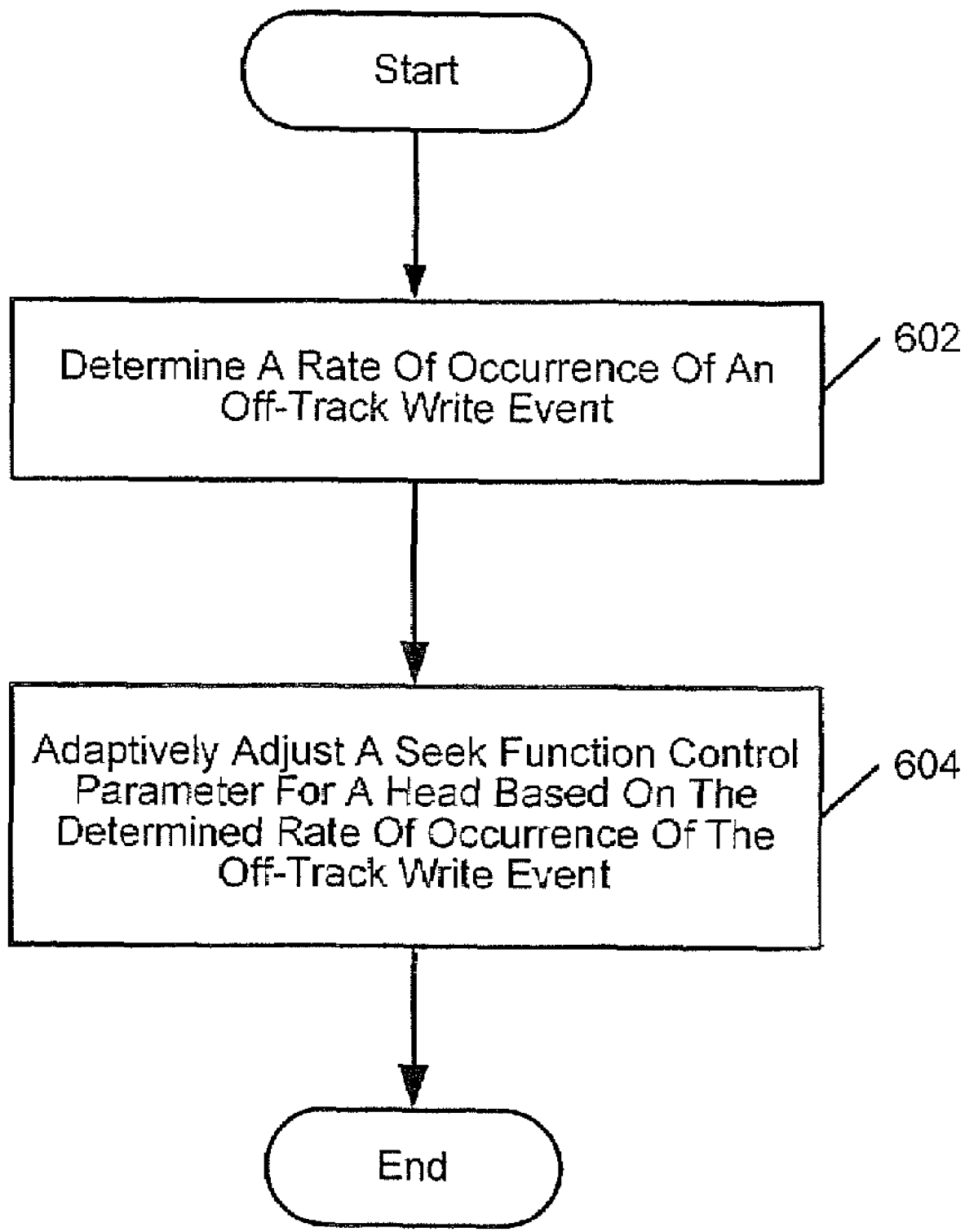
FIGS. 6 and 7 are flowcharts illustrating operations for adaptively adjusting seek function control parameters for heads in a disk drive according to some embodiments.

FIG. 6 is a flowchart illustrating operations for monitoring the occurrence of off-track write events according to some embodiments. Referring now to FIG. 6, a rate of occurrence for an off-track write event is determined (at Block 602). For example, the rate of occurrence of an off-track write event having a magnitude that exceeds a write fault threshold by an overshoot amount (i.e., a WFGPO event) may be determined based on accumulated data for a plurality of off-track write events. More particularly, magnitude data and/or seek length data for the plurality of off-track write events may be stored in a table, such as the off-track write event tables 330 and/or 335 of FIGS. 3A-3B, and may be used to determine the rate of occurrence of off-track write events having a particular magnitude and/or relative to a particular seek length range. Also, the rate of occurrence of an off-track write event may be estimated based on extrapolation of the accumulated data for a desired number of seek operations if the accumulated sample size is insufficient. In addition, the rate of occurrence of an off-track write event may be predicted, for example, based on the transfer function of a particular head and an estimated seek current as discussed above.

Based on the determined rate of occurrence of the off-track write event, a current seek function control parameter for the corresponding head is adaptively adjusted (at Block 604). For instance, if the rate of occurrence of a WFGPO event having a magnitude greater than the squeeze capability of the head is greater than a desired rate of occurrence, such as $1e^{-6}$, one or more current seek function control parameters may be modified to improve accuracy in positioning the head on the target track. More particularly, the number of servo sample counts that may be required to complete the settle stage of a seek operation may be increased, a settle window may be decreased to a reduced percentage of the width of the target track for observing servo samples and/or to an increased amount of time, an increment/decrement/hold settle scheme for the head may be modified, a seek current profile may be modified, and/or seek controller gain settings and/or filter coefficients may be adjusted. As such, due to the more restrictive seek function control parameters, the probability of occurrence of future off-track write events may be reduced, although it may be at the expense of increased seek time.

Figure 7:
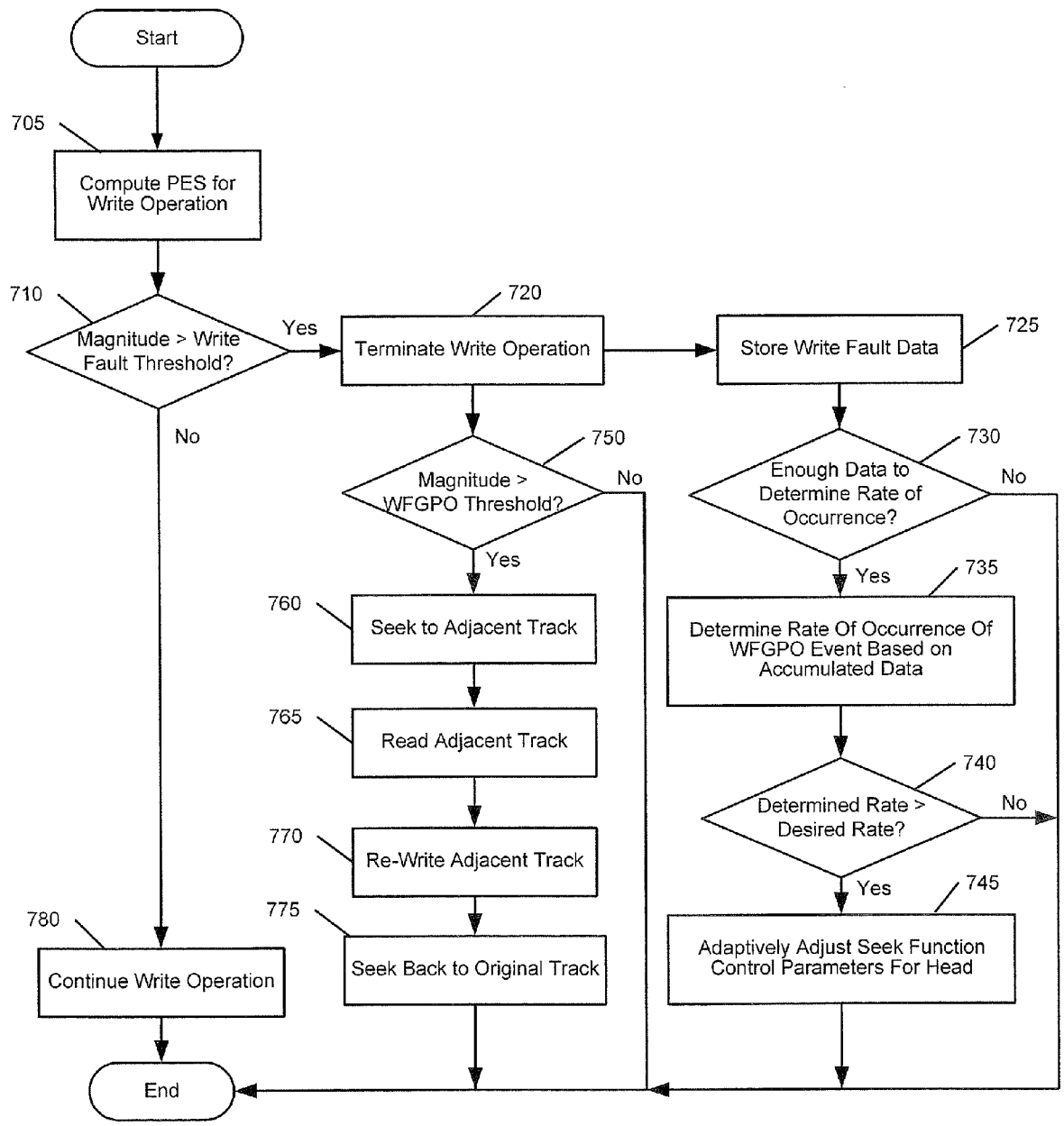

FIG. 7 is a flowchart illustrating additional operations for monitoring the occurrence of off-track write events according to some embodiments. Referring now to FIG. 7, a position error signal (PES) for a write operation is computed (at Block 705). For instance, the position error signal may be computed based on a read signal from a particular head indicating changes in radial location of the head relative to a centerline of a target track. Based on the position error signal, it is determined whether an off-track write event having a magnitude that exceeds the write fault threshold has occurred (at Block 710). If not, the write operation continues (at Block 780). However, if the position error signal indicates an off-track write event having a magnitude greater than the write fault threshold, the write operation is terminated (at Block 720). For example, the write fault threshold may be about 15% of the width or pitch of the target track, and the magnitude of the off-track write event may be about 21%.

Moreover, if it is determined that the magnitude of the off-track write event further exceeds a write-fault-gate-plus-overshoot (WFGPO) threshold (at Block 750), a seek operation is performed to position the head on an adjacent track that may be affected by the off-track write event (at Block 760). For example, the overshoot threshold may be about 20% of the width of the target track for the 21% off-track write event discussed above. The overshoot threshold may be based on a squeeze capability of the head. The squeeze capability may be determined on a per-head basis for multiple heads (for example, based on measurements performed during manufacturing testing of each head) and/or based on an average value for a sample of heads. After settling on the adjacent track, the adjacent track is read (at Block 765) and re-written (at Block 770). The reading and re-writing of the adjacent track may also be referred to herein as an adjacent track refresh operation.

In some embodiments, after the data is read from the adjacent track (at Block 765), the data may be written in a temporary storage location to safely store the data in the event of a loss of power during the re-write operation (at Block 770). The temporary storage location may be checked for any pending re-write operations upon power-up, to ensure that no re-writes were terminated due to the power loss, and re-written to the adjacent track from the temporary storage location. Upon a successfully re-writing the data to the adjacent track (at Block 770), the temporary storage location may be erased. After the refresh operation, a seek operation is performed to position the head back on the original target track (at Block 775). It should be noted that, although the adjacent track is read (at Block 765) and re-written (at Block 770) immediately after the off-track write event in FIG. 7, the adjacent track refresh may be performed at other times, such as after the original write operation is completed and/or during an idle time to reduce the impact on drive performance.

In addition, responsive to termination of the write operation (at Block 720), various data corresponding to the off-track write event, such as the magnitude of the off-track write event and/or corresponding overshoot amount, is stored in a table, such as the off-track write event table 330 of FIG. 3A (at Block 725). If the table includes a sufficient amount of data to determine a rate of occurrence of off-track write events having a particular magnitude (at Block 730), the rate of occurrence is determined based on the accumulated data (at Block 735). If the determined rate of occurrence is greater than a desired rate of occurrence for off-track write event of the particular magnitude (at Block 740), one or more current seek function control parameters for the corresponding head are adaptively adjusted (at Block 745). For example, if it is determined that a WFGPO event having a magnitude of more than about 30% to 35% occurs more than 1 time for every 1 million seek operations, a variety of current settle parameters (such as a settle window, a number of servo sample counts required for completion of a settle operation, and/or an increment/decrement/hold settle scheme) may be modified to increase the accuracy in positioning the head.

Thus, according to some embodiments, the rate of occurrence of off-track write events that exceed a desired threshold may be projected, and seek function control parameters and/or write-fault parameters may be adaptively adjusted based on the rate of occurrence to thereby reduce the probability of occurrence of future off-track write events. In addition, if the magnitude of an off-track write event exceeds an overshoot threshold, one or more adjacent data tracks affected by the off-track write event may be corrected by re-writing the data on the adjacent track(s), thereby reducing and/or eliminating the possibility of a future double-sided squeeze event.

In the drawings and specification, there have been disclosed typical preferred embodiments and, although specific terms are employed, they are used in a generic and descriptive sense only and not for purposes of limitation, the scope being set forth in the following claims.

That which is claimed:

1. A method of monitoring occurrence off-track write events, the method comprising:
    determining a rate of occurrence of off-track write events for a head relative to a rotatable storage disk; and
    adaptively adjusting a seek function control parameter for the head based on the determined rate of occurrence of the off-track write events to reduce a rate of occurrence of future off-track write events toward no more than a desired threshold.

2. The method of claim 1, wherein determining the rate of occurrence comprises:
    determining a squeeze capability of the head; and
    determining the rate of occurrence of off-track write events having a magnitude greater than or equal to the squeeze capability.

3. The method of claim 1, wherein determining the rate of occurrence further comprises:
    measuring a squeeze capability of the head; and
    determining a magnitude of off-track write events at a desired rate of occurrence,
    wherein adaptively adjusting the seek function control parameter comprises modifying the seek function control parameter if the magnitude of the off-track write events at the desired rate of occurrence is greater than the measured squeeze capability.

4. The method of claim 1, wherein at least one of the off-track write events has a magnitude that exceeds a write fault threshold by at least an overshoot amount.

5. The method of claim 1, wherein the seek function control parameter comprises a number of servo samples to be counted for completion of a settle stage of a seek operation, and wherein adaptively adjusting the seek function control parameter comprises:
    increasing the number of servo samples to be counted for completion of the settle stage based on the determined rate of occurrence of the off-track write events.

6. The method of claim 1, wherein the seek function control parameter comprises a settle window for observing servo samples within a percentage of a width of a data track to complete a settle stage of a seek operation, and wherein adaptively adjusting the seek function control parameter comprises:
    adjusting the settle window to a reduced percentage of the width of the data track for observing the servo samples based on the determined rate of occurrence of the off-track write event.

7. The method of claim 1, wherein the seek function control parameter comprises a timer-based settle window to complete a settle stage of a seek operation, and wherein adaptively adjusting the seek function control parameter comprises:
    adjusting the settle window to an increased amount of time based on the determined rate of occurrence of the off-track write event.

8. The method of claim 1, wherein the seek function control parameter comprises a seek current profile, and wherein adaptively adjusting the seek function control parameter comprises:
    modifying the seek current profile for the head based on the determined rate of occurrence of the off-track write event.

9. The method of claim 1, wherein adaptively adjusting the seek function control parameter further comprises:
    adjusting a write fault threshold for the head based on the determined rate of occurrence of the off-track write events.

10. The method of claim 1, wherein adaptively adjusting the seek function control parameter further comprises:
    adjusting an overshoot threshold for the head based on the determined rate of occurrence of the off-track write events.

11. The method of claim 1, wherein adaptively adjusting the seek function control parameter further comprises:
    adjusting a number of servo samples to be counted in a settle window based on a percentage of a width of a data track to complete a settle stage of a seek operation.

12. The method of claim 1, further comprising:
reading and re-writing at least a portion of an adjacent track affected by an off-track write event responsive to determining that an overshoot amount of the off-track write event exceeds an overshoot threshold.

13. The method of claim 1, wherein determining the rate of occurrence further comprises:
determining respective rates of occurrence of off-track write events for a plurality of heads,
and wherein adaptively adjusting the seek function control parameter further comprises separately adjusting respective seek function control parameters for the plurality of heads on a per-head basis based on the respective rates of occurrence.

14. The method of claim 1, further comprising:
accumulating data for a plurality of off-track write events having respective magnitudes responsive to a plurality of seek operations using the seek function control parameter; and
determining the rate of occurrence of the off-track write events based on the accumulated data.

15. The method of claim 14, wherein accumulating data comprises:
determining respective magnitude data for the plurality of off-track write events; and
storing the respective magnitude data,
wherein determining the rate of occurrence comprises determining the rate of occurrence of off-track write events of a particular magnitude based on the stored magnitude data for the plurality of off-track write events, and wherein adaptively adjusting the seek function control parameter comprises modifying the seek function control parameter when the determined rate of occurrence exceeds a desired rate of occurrence for off-track write events of the particular magnitude.

16. A method of monitoring occurrence off-track write events, the method comprising:
accumulating data for a plurality of off-track write events having respective magnitudes responsive to a plurality of seek operations using a seek function control parameter;
recording a total number of seek operations performed during accumulation of the data for the plurality of off-track write events;
determining a rate of occurrence of off-track write events for a head relative to a rotatable storage disk based on the accumulated data and relative to the total number of seek operations; and
adaptively adjusting the seek function control parameter for the head based on the determined rate of occurrence of the off-track write events.

17. The method of claim 16, wherein accumulating data further comprises:
storing seek length data respectively indicating a number of tracks between an initial track and a target track for respective ones of the plurality of seek operations,
wherein determining the rate of occurrence comprises determining the rate of occurrence of off-track write events based on the seek length data, and wherein adaptively adjusting the seek function control parameter comprises modifying the seek function control parameter based on the rate of occurrence.

18. A method of monitoring occurrence off-track write events, the method comprising:
accumulating data for a plurality of off-track write events having respective magnitudes responsive to a plurality of seek operations using a seek function control parameter;
determining a rate of occurrence of off-track write events for a head relative to a rotatable storage disk by estimating the rate of occurrence of the off-track write events based on extrapolation of the accumulated data for the plurality of off-track write events; and
adaptively adjusting the seek function control parameter for the head based on the determined rate of occurrence of the off-track write events.

19. A method of monitoring occurrence off-track write events, the method comprising:
determining a rate of occurrence of off-track write events for a head relative to a rotatable storage disk by predicting the rate of occurrence of the off-track write events based on an estimated seek current profile and a transfer function of the head; and
adaptively adjusting a seek function control parameter for the head based on the determined rate of occurrence of the off-track write events.

20. The method of claim 19, wherein predicting the rate of occurrence further comprises:
estimating a settle response for a plurality of modes of vibration based on the seek current profile and the transfer function of the head; and
predicting the rate of occurrence based on relative alignment of the settle responses for at least two of the plurality of modes of vibration.

21. A circuit, comprising:
a controller implemented in hardware, wherein the controller determines a rate of occurrence of off-track write events and adaptively adjusts a seek function control parameter for a head when the determined rate of occurrence of the off-track write events exceeds a predefined rate of occurrence to reduce a rate of occurrence of future off-track write events toward no more than the predefined rate of occurrence.

22. The circuit of claim 21, wherein the controller comprises:
a rate determination unit that determines respective rates of occurrence of off-track write events for a plurality of heads; and
a seek controller that separately adjusts respective seek function control parameters for the plurality of heads on a per-head basis based on the respective rates of occurrence.

23. The circuit of claim 22, wherein the rate determination unit determines a squeeze capability of at least one of the plurality of heads and determines the respective rate of occurrence of off-track write events having a magnitude greater than or equal to the squeeze capability for the at least one of the plurality of heads.

24. The circuit of claim 22 wherein the rate determination unit measures a squeeze capability of at least one of the plurality of heads and determines a magnitude of corresponding off-track write events at a desired rate of occurrence, and wherein the seek controller modifies the respective seek function control parameter for the at least one of the plurality of heads if the magnitude of the off-track write events at the desired rate of occurrence is greater than the measured squeeze capability.

25. The circuit of claim 21, wherein the controller accumulates data in a table for a plurality of off-track write events having respective magnitudes that exceed a write fault threshold by at least respective overshoot amounts responsive to a plurality of seek operations using the seek function control parameter and determines the rate of occurrence of the off-track write events based on the accumulated data.

26. The circuit of claim 25, wherein the controller further stores respective magnitude data for the plurality of off-track write events in the table, determines the rate of occurrence of off-track write events of a particular magnitude based on the stored magnitude data for the plurality of off-track write events, and modifies the seek function control parameter when the determined rate of occurrence exceeds a desired rate of occurrence for off-track write events of the particular magnitude.

27. The circuit of claim 21 wherein at least one of the off-track write events has a magnitude that exceeds a write fault threshold by at least an overshoot amount.

28. The circuit of claim 21, wherein the seek function control parameter comprises a number of servo samples to be counted for completion of a settle stage of a seek operation, a settle window based on an amount of time and/or a percentage of a width of a data track for observing servo samples to complete a settle stage of a seek operation, a controller gain setting, a controller filter coefficient, and/or a seek current profile.

29. A disk drive, comprising:
a rotatable data storage disk;
a head that is adjacent to the rotatable storage disk; and
a controller that determines a rate of occurrence of off-track write events and adaptively adjusts a seek function control parameter for the head based on the determined rate of occurrence of the off-track write events to reduce a rate of occurrence of future off-track write events toward no more than a desired threshold.

* * * * *